UNITED STATES PATENT OFFICE.

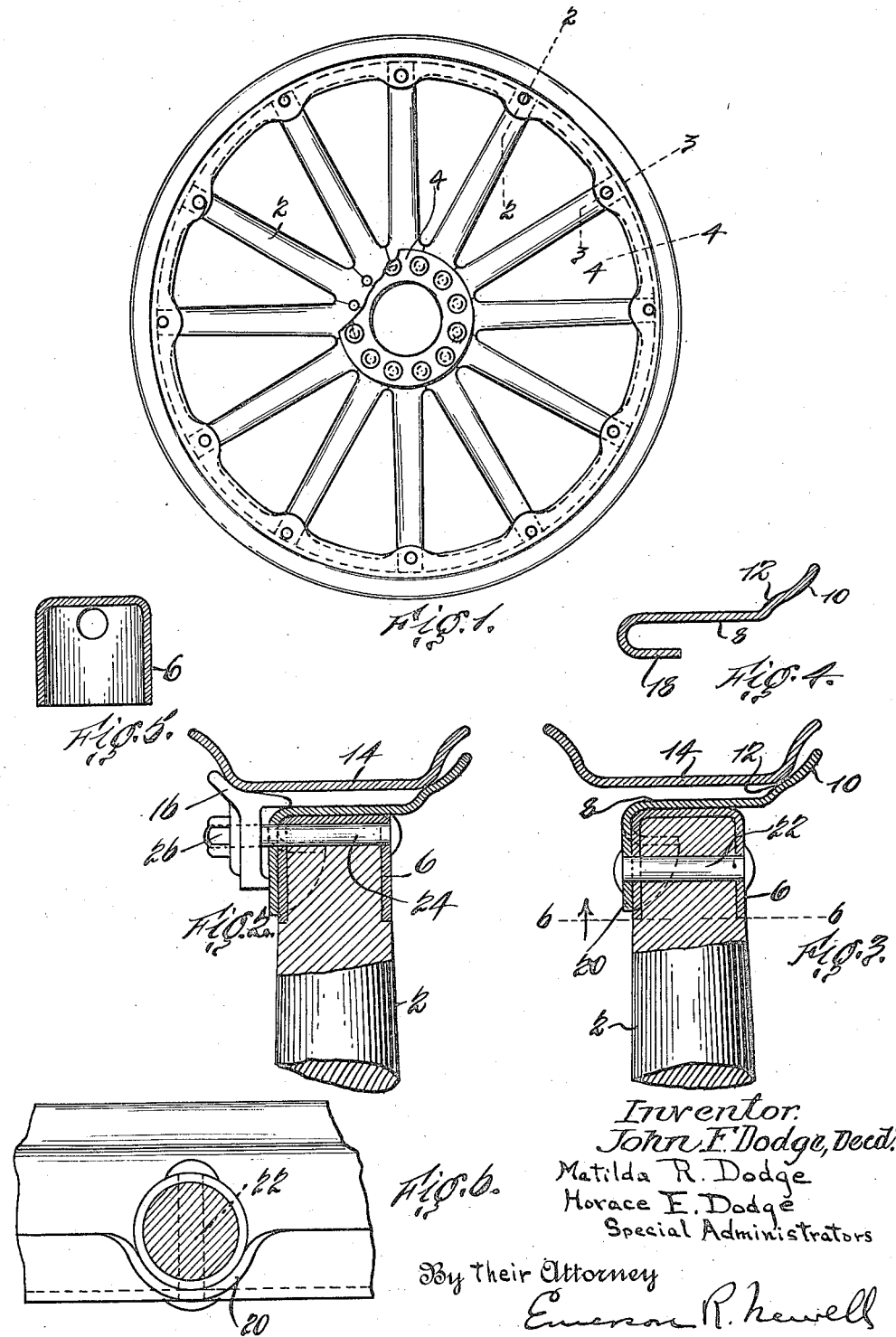

JOHN F. DODGE, DECEASED, LATE OF DETROIT, MICHIGAN, BY MATILDA R. DODGE, OF DETROIT, MICHIGAN, AND HORACE E. DODGE, OF GROSSE POINTE, MICHIGAN, SPECIAL ADMINISTRATORS, ASSIGNORS TO DODGE BROTHERS, OF DETROIT, MICHIGAN, A CORPORATION OF MICHIGAN.

WHEEL AND METHOD OF MAKING THE SAME.

1,423,556.        Specification of Letters Patent.      Patented July 25, 1922.

Application filed September 3, 1920. Serial No. 408,064.

*To all whom it may concern:*

Be it known that JOHN F. DODGE, deceased, late a citizen of the United States, and formerly residing at Detroit, in the county of Wayne and State of Michigan, did invent certain new and useful Improvements in Wheels and Method of Making the Same, of which the following is a clear, full, and exact description.

This invention relates to vehicle wheels, and particularly to vehicle wheels which are intended to be used with pneumatic or other cushioning tires, and a general object of the invention is to provide an improved vehicle wheel of light, strong and accurately centered construction, and also to facilitate the manufacture of such improved wheels.

More particularly, the invention aims to improve both the construction and the mode of manufacture of vehicle wheels of the general type disclosed in United States Letters Patent to Erle King Baker No. 1,321,001, granted November 4, 1919, and which comprise usually a metal hub, wooden spokes, and a steel or other metal felly band. In the construction of wheels of the type disclosed in the patent to Baker above identified, it has been usual to assemble the wooden spokes in the hub, and then, by lateral or axial pressure upon the hub, to force the spokes into the steel felly band, after which the felly is contracted by suitable means such as well known tire setting machines. By this method a considerable amount of radial pressure is put upon the spokes, and the wheel may be made very rigid.

It will be apparent, however, that in a wheel thus constructed there is considerable likelihood of the pressure brought to bear upon the different spokes being unequal. One of the objects of the present invention, therefore, is to provide both a wheel construction and a mode of manufacturing a wheel of this general type which will obviate the likelihood of unequal pressure being brought to bear upon the different spokes and which moreover will facilitate the assemblying of the wheel with respect to the axis of rotation.

Other objects and important features of the invention will appear from the following description and claims when considered in connection with the accompanying drawings, in which—

Fig. 1 is a view of an assembled wheel embodying the present invention;

Fig. 2 is a section on the line 2—2 of Fig. 1;

Fig. 3 is a section on the line 3—3 of Fig. 1;

Fig. 4 is a section on the line 4—4 of Fig. 1;

Fig. 5 is a transverse section through one of the hub caps; and

Fig. 6 is a section on the line 6—6 of Fig. 3.

In constructing the illustrated wheel, the wooden spokes 2 are assembled in the hub 4, each of the spokes being preferably first provided with a metal cap 6 which is tightly pressed upon the end of the spoke. It will be understood, of course, that this cap could also be pressed upon the spoke after the spoke is assembled in the hub. Each of the spokes, with its attached cap 6, is preferably of a length slightly greater than the desired length in the completed wheel, to provide for a slight grinding away of the cap ends to a uniform radial distance from the axis of rotation of the wheel.

The spokes 2 having been assembled in the hub 4 in the manner set forth, the hub is then mounted upon a centering spindle—not shown—which will ensure the rotation of the hub and spoke assembly about the same axis which the hub will turn on when on the vehicle axle, and the spokes are then presented, by rotation of the assembly on the spindle, successively to a grinding wheel located at such a distance from the axis of rotation that the end of each of the caps 6 will be ground back to a radial distance from the axis of rotation which will be the same for each cap end. This dressing off of the ends of the metal caps upon the spokes to the same radius from the axis of rotation of the wheel, or of the hub and spoke assembly, ensures an absolutely concentric bearing for the steel felly band 8, the radius to which the caps are dressed being of course the same as the inside radius of the felly band.

The hub and spoke assembly having been treated in the manner above set forth to make uniform the radial distance of the spoke ends from the axis of rotation, the felly band 8 is then placed upon the spokes. It will be obvious that a very good fit can be obtained by this method even before the felly band is contracted.

It will be noted that the illustrated felly band has an upturned flange 10 shaped to provide an abutting shoulder 12 against which the demountable rim 14 is forced by the wedge clamps 16 in the usual manner. The felly band also has between the spokes a downwardly and inwardly turned flange 18, this flange being bent downwardly in the region of the spokes to form a portion 20 partly embracing each spoke or each spoke cap 6, as shown particularly in Fig. 6 and as also shown in dotted lines in Figs. 2 and 3.

After the spoke assembly has been positioned in the felly band and the felly band has been contracted upon the spokes, the spokes are fastened to the felly band through the down-turned portions 20 of the flange 18, either by means of rivets 22 or by means of bolts 24 upon which the clamps 16 are carried, these bolts being threaded to receive the nuts 26 by which the clamps are forced into holding relation to the demountable rims 14 and locked in such relation. It will be noted that the rivets 22 and the bolts 24 pass not only through the spokes 2 but also through the caps 6 upon the ends of said spokes, whereby a very strong and durable connection between the felly band and the spokes is obtained.

From the foregoing description, it will be noted that a light, strong and accurately centered wheel construction is provided, and that the method of forming and assembling the wheel herein disclosed renders it economical to manufacture and insures substantial uniformity of the product. It will be understood, however, that the invention is not restricted to the details of construction herein shown and described, and that the invention in many of its aspects is of general utility in the art to which it relates.

What is claimed as new is:

1. The method of making a vehicle wheel having wooden spokes and a metal felloe, which consists in assembling in the wheel hub wooden spokes having ends encased in metal caps, successively presenting the ends of said caps to reducing means located at the desired uniform distance of said ends from the axis of rotation of said hub, whereby the seats for the metal felloe upon the metal caps are brought to uniform distances from the axis of rotation of the wheel, and then setting said metal felloe upon said metal seats.

2. The method of making a vehicle wheel having wooden spokes and a metal felly, which consists in assembling in a hub wooden spokes provided on their outer ends with metal caps, mounting the hub and spoke assembly upon a centering spindle upon which it may rotate, and successively presenting said caps to grinding means arranged with respect to said spindle to grind back the metal caps to a uniform radial distance of their outer ends from the axis of rotation, and then setting the metal felly upon said spokes.

3. A wheel comprising, in combination, a hub, wooden spokes, and a metal felly, said spokes being provided with metal caps having their felly engaging faces ground in assembled position on the spokes and hub to uniform radial spacing from the axis of rotation of the hub.

Signed at Detroit, Michigan, this 19th day of August, 1920.

MATILDA R. DOGDE,
HORACE E. DODGE,
*Special Administrators of John F. Dodge, deceased.*